United States Patent Office 3,507,944
Patented Apr. 21, 1970

3,507,944
REFRACTORY SLURRY AND METHOD OF CASTING UTILIZING ALUMINA COATED SILICA SOL BINDER AND HEXAMETHYLENETETRAMINE AS A SETTING AGENT
Earl P. Moore, Jr., Wilmington, Del., assignor to E. I. du Pont de Nemours and Company, Wilmington, Del., a corporation of Delaware
No Drawing. Filed Sept. 9, 1968, Ser. No. 758,612
Int. Cl. C04b 33/02, 33/12
U.S. Cl. 264—109                 3 Claims

ABSTRACT OF THE DISCLOSURE

A refractory slurry and a method of making a refractory article from said slurry. The slurry having a pH of less than 5.7 consists of 50–97% refractory particles, 3–50% of a positively charged alumina coated silica sol and hexamethylenetetramine present in amounts up to 1% by weight of the slurry. The pH of the slurry is adjusted to below 5.7 prior to pouring into the mold and after pouring the slurry is set in the mold at an elevated temperature below 100° C. until it has sufficient strength for handling.

BACKGROUND OF THE INVENTION

The preparation of refractory shapes from the aqueous refractory slurries is accomplished by pouring the slurry into a mold to form the desired shape and then setting the slurries prior to removing the mold. There are two general techniques for setting the slurries. In slip casting the refractory mix is set by absorption of water into a porous mold. This way take as long as 24–48 hours. The second method is to chemically set the aqueous refractory slurry. The compositions presently available for this type of chemical setting presents problems by either being too slow in setting after the slurry is poured into the mold or too fast in setting with the resulting short pot life after mixing the ingredients before pouring them into the molds.

The compositions described in the present invention possess the desirable properties of a good pot life after the initial mix of the composition and yet exhibit fast setting times when the temperature is raised.

SUMMARY OF THE INVENTION

An aqueous slurry is prepared from a mixture of positively charged alumina coated silica sol, a minor portion of hexamethylenetetramine and a refractory particle such as, alumina, silica, mullite, "Fiberfrax" and "Kaowool." When a particular refractory particle is selected, the pot life of the composition can be varied by the selection of the amount of sol or hexamethylenetetramine as desired. Thus, once the refractory particle is selected the composition can be empirically adjusted to meet the needs of the industrial application being utilized.

DESCRIPTION OF THE INVENTION

The components may be generally mixed with one another in any order to form the aqueous refractory slurry. The refractory particles may be added to the positively charged silica sol and then thoroughly mixed with the sol. After thorough mixing, and hexamethylenetetramine may be added and the mixing is continued.

During the mixing gases are frequently entrapped in the mixture and it is desirable to remove them. In most part these gases would be air which would result in bubbles which would weaken the final formed structure. The degassing may be accomplished by pressure differentials or by mechanical means such as vibrators which will essentially dislodge the gas bubbles.

The degassed slurry is then pumped into molds of the desired shape. The temperature around the mold is generally increased to 50–60° C. which will result in the initial setting of the slurry. The temperature should not exceed 100° C. since it is not desirable at this time to drive off all of the water from the aqueous slurry because cracking may occur. A visual determination will indicate when the mold is set and then the mold may be removed. The resulting article, while not finally set, has enough green strength to be handled and placed in a drying oven to further improve the green strength. Finally, the article may be placed in a high temperature oven for firing. After the firing, the hard, shaped, completely cured article is obtained.

The acid stabilized positively charged alumina coated silica sol can have an ultimate particle size of about 4 millimicrons to 100 millimicrons, a pH of about 3 to about 6 and about 10 to 50% solids. The preparation nature of these sols are described in Alexander and Bolt, U.S. Patent 3,007,878, Mindick and Revin, U.S. Patent 3,139,406, and Mindick and Thompson, U.S. Patent 3,252,917.

The hexamethylenetetramine is a commercially available compound. The amount of this ingredient used is generally that amount which when totally hydrolyzed would raise the pH of the refractory slurry to a point above a pH of 6.0 to cause setting of the positive sol binder. Generally, no more than 1% by weight of hexamethylenetetramine based upon the total weight of the aqueous slurry would be used in this composition. The amount of this component will also depend upon the type of refractory material being used. The pH of the particular refractory material will vary and naturally less hexamethylenetetramine will be needed to obtain the desired pot life when the refractory material adds to the increase of the pH of the total solution.

Refractory particles such as alumina, silica, zircon, mullite, zirconia, mica, silica-alumina grains are useful in this invention. Additionally, fibers such as "Fiberfrax," "Kaowool" and "Fiberglas" are also suitable. As known in the art, certain refractory materials are basic substance and as such would be unsuitable for this invention.

Refractory aggregates which when mixed with water form an aqueous slurry to give a pH of 8 or less may be utilized in this invention. This would also include mixtures of refractory particles or fibers which meet this pH requirement. Naturally the aggregate must be stable at an acidic pH.

The refractory aggregates can contain alkali impurities which might leach out into solution to increase the pH. Since the positively charged alumina coated silica sol will begin to set at a pH above 6, it is necessary to reduce the pH caused by these impurities by adding a common mineral acid. The slurry of refractory aggregates, sol and hexamethylenetetramine should not have a pH exceeding 5.7 and the pH should be adjusted accordingly, preferably to a pH of about 5.4.

The concentration of the refractory material in the slurry will depend greatly on the refractory particle size. Generally, the refractory would not be present in quantities greater than 97% by weight of the slurry or much less than 70% by weight although it could go as low as 50% by weight. The higher refractory concentrations are best achieved with larger refractory particle sizes. Conversely, the lower concentrations are best achieved using the smaller refractory particles sizes.

The use of positively charged alumina coated silica sol and hexamethylenetetramine preparing the aqueous refractory slurries of this invention give a flexible composition which can result in lengthened pot life (working life) and yet have shorter initial setting times. This results in a shaped article having a stronger green strength in shorter times than presently available by the known processes.

EXAMPLE 1

Five pounds of a refractory slurry consisting of:

| | Percent |
|---|---|
| −325 mullite | 14.5 |
| −325 alumina | 20.0 |
| −28+100 alumina | 10.0 |
| −14+28 alumina | 15.0 |
| −8+14 alumina | 29.0 |
| Binder [1] | 9.0 |
| Water | 2.4 |
| Hexamethylenetetramine | .08 |

[1] Average analysis: 26% $SiO_2$, 4% $Al_2O_3$. Average particle size: 16–17 millimicrons; pH 4.5; density 1.23.

is prepared in a Hobart mixer. The pH of the mix is approximately 5.65. A sample of the mix has a pot life of two hours at 25° C.

The refractory slurry is poured into a mold. The mold is placed in a 60° C. water bath. After twenty minutes of heating the ceramic slurry is set, the mold is removed, and the ceramic form can be handled.

EXAMPLE 2

Five pounds of the refractory slurry of Example 1 is prepared. The amount of hexamethylenetetramine is increased to one-tenth of one percent. The pH of the mix is approximately 5.65. A sample of the mix has a pot life of two hours at 25° C.

The refractory slurry is poured into a mold. The mold is placed in a 60° C. water bath. After twelve minutes of heating the ceramic slurry is set, the mold is removed and the ceramic form can be handled.

EXAMPLE 3

Five pounds of the refractory slurry of Example 1 is prepared. The refractory slurry is poured into a mold. The mold is placed in a 90° C. water bath. After nine minutes of heating the ceramic slurry is set, the mold is removed and the ceramic form can be handled.

EXAMPLE 4

Five pounds of a refractory slurry consisting of:

| | Percent |
|---|---|
| −325 alumina | 35.0 |
| −28+100 alumina | 9.5 |
| −14+28 alumina | 15.3 |
| −8+14 alumina | 29.0 |
| Binder of Example 1 | 9.0 |
| Water | 2.0 |
| Hexamethylenetetramine | .1 | is prepared in a Hobart mixer. The pH of the mix is approximately 5.7. A sample of the mix has a pot life of one and a half hours at 25° C.

The refractory slurry is poured into a mold. The mold is placed in a 60° C. water bath. After twenty minutes of heating the ceramic slurry is set, the mold is removed, and the ceramic form can be handled.

EXAMPLE 5

Five pounds of a refractory slurry consisting of:

| | Percent |
|---|---|
| −325 alumina | 23.6 |
| −325 fused silica | 15.7 |
| −200+325 fused silica | 23.6 |
| −40+60 fused silica | 15.7 |
| Binder of Example 1 | 20.5 |
| Water | .4 |
| Hexamethylenetetramine | .3 | is prepared in a Hobart mixer. The pH of the mix is approximately 5.5. A sample of the mix has a pot life of greater than eight hours at 25° C.

The refractory slurry is poured into a mold. The mold is placed in a 90° C. water bath. After seven minutes of heating the ceramic slurry is set, the mold is removed, and the ceramic form can be handled.

EXAMPLE 6

Five pounds of a refractory slurry consisting of:

| | Percent |
|---|---|
| −325 zircon | 63.4 |
| −100+200 zircon | 15.3 |
| Binder of Example 1 | 21.0 |
| Hexamethylenetetramine | .3 | is prepared in a Hobart mixer. The pH of the mix is approximately 5.3. A sample of the mix has a pot life of greater than twenty four hours at 25° C.

The refractory slurry is poured into a mold. The mold is placed in a 90° C. water bath. After twenty minutes of heating the ceramic slurry is set, the mold is removed, and the ceramic form can be handled.

EXAMPLE 7

Five pounds of a refractory slurry consisting of:

| | Percent |
|---|---|
| −325 mullite | 67.1 |
| −65+100 mullite | 7.5 |
| Binder of Example 1 | 25.0 |
| Hexamethylenetetramine | .4 | is prepared in a Hobart mixer. The pH of the mix is approximately 5.5. A sample of the mix has a pot life of greater than seven hours at 25° C.

The refractory slurry is poured into a mold. The mold is placed in a 90° C. water bath. After twenty eight minutes of heating the ceramic slurry is set, the mold is removed, and the ceramic form is able to be handled.

EXAMPLE 8

Five pounds of a refractory slurry consisting of:

| | Percent |
|---|---|
| −325 fused silica | 38.0 |
| −200+325 fused silica | 22.8 |
| −8+50 fused silica | 15.3 |
| Binder of Example 1 | 23.5 |
| Hexamethylenetetramine | .2 | is prepared in a Hobart mixer. The pH of the mix is approximately 5.2. A sample of the mix has a pot life of greater than twenty four hours at 25° C.

The refractory slurry is poured into a mold. The mold is placed in a 90 C. water bath. After one and a half hours of heating the ceramic slurry is set, the mold is removed, and the ceramic form is able to be handled.

What is claimed is:

1. An aqueous slurry for preparing refractory articles which has a pH of less than 5.7 consisting essentially of 50–97% by weight of the slurry of a refractory material selected from the group consisting of alumina, fused silica, mullite, zircon, and mixtures thereof, 3–50% by weight of the slurry of a binder of positively charged alumina coated silica sol having an ultimate particle size of about 4–100 millimicrons and a pH of about 3–6, and hexamethylenetetramine present in an amount up to 1% by weight of the slurry.

2. A slurry as in claim 1 where said refractory is present in an amount of about 70% to 97% by weight based on the slurry weight.

3. In a process for preparing shaped refractory articles from refractory materials selected from the group consisting of alumina, fused silica, mullite, zicron, and mixtures thereof, by mixing the material with an inorganic binder in an aqueous slurry, setting the mixture in a mold, removing the mold and firing the molded article, the improvement comprising using 3–50% by weight of the slurry of a positively charged alumina coated silica sol having an ultimate particle size of 4–100 millimicrons and a pH of about 3–6 as the binder along with hexamethylenetetramine in an amount up to 1% by weight of the slurry, where the pH of said slurry prior to molding is adjusted to less than 5.7, and setting the mixture at an elevated temperature no greater than 100° C.

References Cited

UNITED STATES PATENTS

| | | | |
|---|---|---|---|
| 2,942,991 | 6/1960 | Smith | 106—57 |
| 3,024,125 | 3/1962 | Lee | 106—85 |
| 3,228,779 | 1/1966 | Van Der Beck | 106—69 |
| 3,231,401 | 1/1966 | Price et al. | 106—69 |
| 3,252,917 | 5/1966 | Mindick et al. | 252—313 |
| 3,312,631 | 4/1967 | Smith | 264—15 |
| 3,445,250 | 5/1969 | Preece | 106—65 |

FOREIGN PATENTS

| | | |
|---|---|---|
| 764,000 | 7/1967 | Canada. |
| 967,934 | 8/1964 | Great Britain. |

DONALD J. ARNOLD, Primary Examiner

J. H. MILLER, Assistant Examiner

U.S. Cl. X.R.

106—38.35, 39, 57, 65, 69, 85; 264—63